UNITED STATES PATENT OFFICE.

JOHN D. RICHMOND, JR., OF NEW LIBERTY, KENTUCKY.

IMPROVEMENT IN MEDICAL COMPOUNDS FOR COUGHS, COLDS, &c.

Specification forming part of Letters Patent No. 117,930, dated August 8, 1871.

*To all whom it may concern:*

Be it known that I, JOHN D. RICHMOND, Jr., of New Liberty, Owen county, Kentucky, have invented a certain Compound for Coughs, Colds, &c., of which the following is a specification:

This invention relates to a simple and harmless remedy for the cure of diseases of the throat and lungs, said compound being composed of the following ingredients: Pulverized gum guaiacum, one-half ounce; ground Jamaica-ginger root, one-quarter ounce; extract of wild cherry, one ounce; pulverized spikenard, one-quarter ounce. After adding one quart of pure whisky to the above ingredients the compound is ready for use.

I claim—

The medical compound, prepared of the ingredients, in the proportions, and for the purposes set forth.

In testimony of which invention I hereunto set my hand.

JOHN D. RICHMOND, JR.

Witnesses:
GEO. H. KNIGHT,
JAMES H. LAYMAN.